(12) United States Patent
Hsu

(10) Patent No.: US 7,547,004 B2
(45) Date of Patent: Jun. 16, 2009

(54) ERGONOMICALLY OPERATING PORTABLE HUMIDIFIER

(76) Inventor: Tsang-Hung Hsu, No. 34-3, Tsai Liau, San Hsieh Li, Chia Li Chen, Tainan Hsien (TW) 722

( * ) Notice: Subject to any disclaimer, the term of this patent is extended or adjusted under 35 U.S.C. 154(b) by 434 days.

(21) Appl. No.: 11/633,330

(22) Filed: Dec. 5, 2006

(65) Prior Publication Data

US 2008/0128926 A1 Jun. 5, 2008

(51) Int. Cl.
*B01F 3/04* (2006.01)
(52) U.S. Cl. .................... 261/81; 261/104; 261/DIG. 48
(58) Field of Classification Search .................... 261/81, 261/104, 107, DIG. 48, DIG. 65
See application file for complete search history.

(56) References Cited

U.S. PATENT DOCUMENTS 4,479,609 A * 10/1984 Maeda et al. ............ 239/102.2
4,753,579 A * 6/1988 Murphy ................... 417/410.2
4,790,479 A * 12/1988 Matsumoto et al. ...... 239/102.2
7,490,815 B2 * 2/2009 Tollens ........................ 261/30

FOREIGN PATENT DOCUMENTS

WO WO 2008/015394 A1 * 7/2007

* cited by examiner

*Primary Examiner*—Scott Bushey

(57) ABSTRACT

A portable humidifier includes: a bottle for storing water therein, a capillary device immersed in the bottle for capillarily absorbing water as stored in the bottle, an ultrasonic vibrator mounted on a upper portion of the bottle for normally contacting a top wick portion of the capillary device and operatively vibrating for compressing the top wick portion for ejecting water mists upwardly outwardly through a plurality of perforations formed through the vibrator, a control device formed on a top cover of the bottle for controlling the on-off operation of the vibrator, a sensor formed on the top cover for sensing the surrounding humidity for reminding the user whether to actuate the control device for humidifying the surrounding, and a light indicator for illuminating and checking water level in the bottle to remind whether to refill water into the bottle.

13 Claims, 4 Drawing Sheets

ERGONOMICALLY OPERATING PORTABLE HUMIDIFIER

BACKGROUND OF THE INVENTION

In a dry room or car interior, it may require a humidifier for humidifying the air for comfortable living or driving. However, it is not available or it is difficult to obtain a portable mini humidifier from the commercial source.

Even a prior art of U.S. Pat. No. 4,085,893 disclosed an ultrasonic humidifier for atomizing water or other liquid, which however has the following drawbacks:
1. A water supply system including conduit or tube must be provided for supplying the water to be atomized by an ultrasonic vibrator, thereby causing a complex structure and unsuitable for portable uses.
2. There is no sensor provided for sensing the humidity in the air.
3. There is also no indicator showing the water content in a water supply system.

The present inventor has found the drawbacks of the prior art and invented the present portable humidifier.

SUMMARY OF THE INVENTION

The object of the present invention is to provide a portable humidifier comprising: a bottle for storing water therein, a capillary device immersed in the bottle for capillarily absorbing water as stored in the bottle, an ultrasonic vibrator mounted on an upper portion of the bottle for normally contacting a top wick portion of the capillary device and operatively vibrating for compressing the top wick portion for ejecting water mists upwardly outwardly through a plurality of perforations formed through the vibrator, a control device formed on a top cover of the bottle for controlling the on-off operation of the vibrator, a sensor formed on the top cover for sensing the surrounding humidity for reminding the user whether to actuate the control device for humidifying the surrounding, and a light indicator for illuminating and checking water stored in the bottle to remind whether to refill water into the bottle.

DETAILED DESCRIPTION

Figure 1:
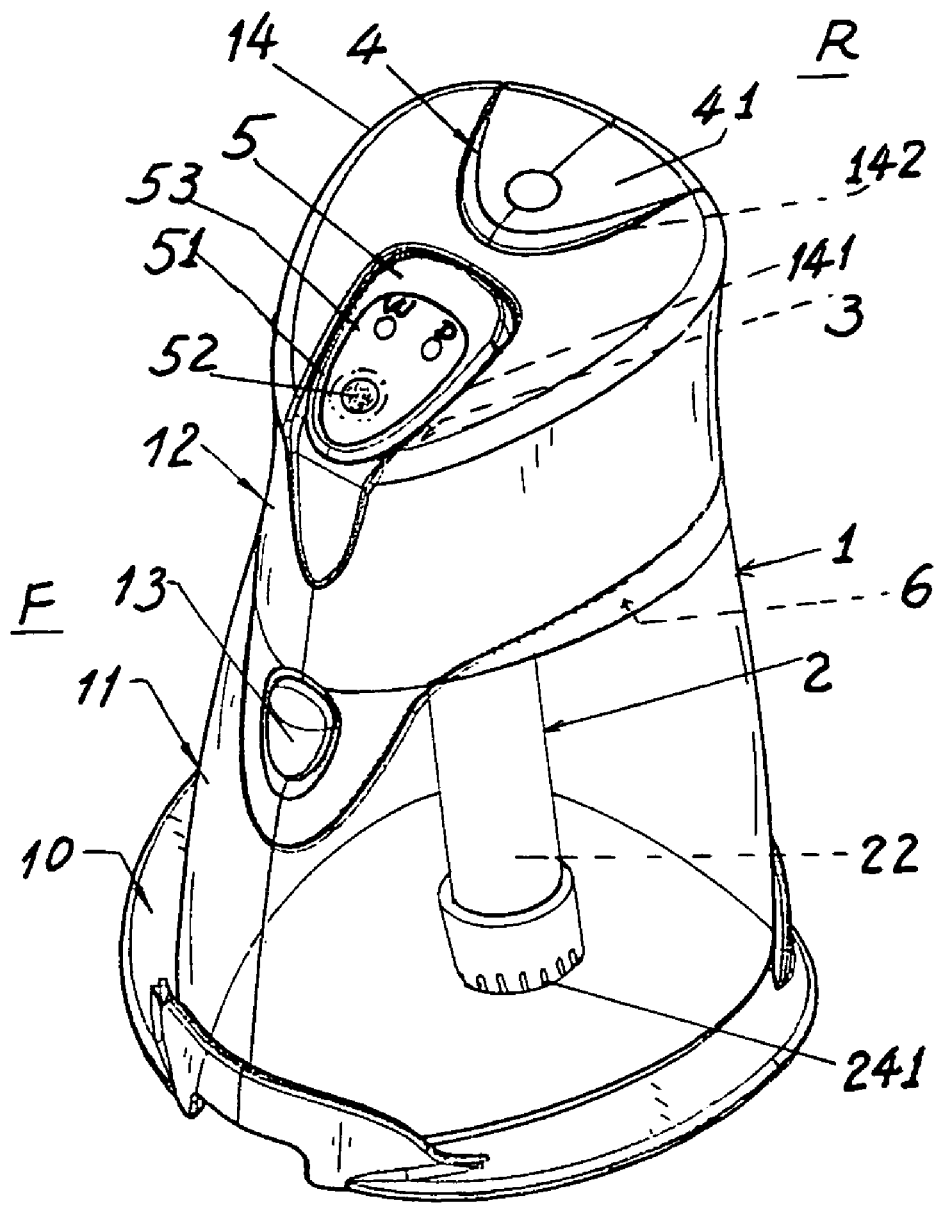
FIG. 1 is a perspective view of the present invention.

As shown in the drawing figures, the present invention comprises: a housing 1, a capillary means 2, an ultrasonic vibrator 3, a control means 4 adjacent to a rear side R of the housing 1, a sensor means 5 adjacent to a front side F of the housing 1, and a light indicator 6.

The housing 1 includes: a transparent bottle 11, a bottom holder 10 embedded on a bottom portion of the bottle 11, a covering plate 111 formed on an upper portion of the bottle 11 for closing the bottle 11 having an upper opening 112 formed through the covering plate 111 for refilling water into the bottle 11 and for inserting the capillary means 2 into the bottle 11 by passing through the opening 112, a side socket 110 formed in the bottle 11 for resiliently providing a coupler 13 in the socket 110 for coupling an upper casing 12 detachably engaged on an upper portion of the bottle 11, and a top cover 14 encapping the upper casing 12.

The capillary means 2 includes: a capillary tube 21 having its upper portion secured in the upper casing 12 of the housing 1 and protruding downwardly through a tube opening 121 formed through the upper casing 12 and through an upper opening 112 in the covering plate 111 to be inserted into the bottle 11; a wick member 22 longitudinally formed in the capillary tube 21 having a top wick portion 23 protruding upwardly from the capillary tube 21 to be contacted with the ultrasonic vibrator 3; a bottom plug 24 fixed on a bottom portion of the capillary tube 21 having a plurality of slots 241 formed in the plug 24 to be fluidically communicated with the wick member 22 disposed in the capillary tube 21; and a tension spring 25 retained in the lower portion of the capillary tube 21 and resiliently urging the wick member 22 upwardly to help a resilient contacting between the top wick portion 23 with the vibrator 3.

Figure 2:
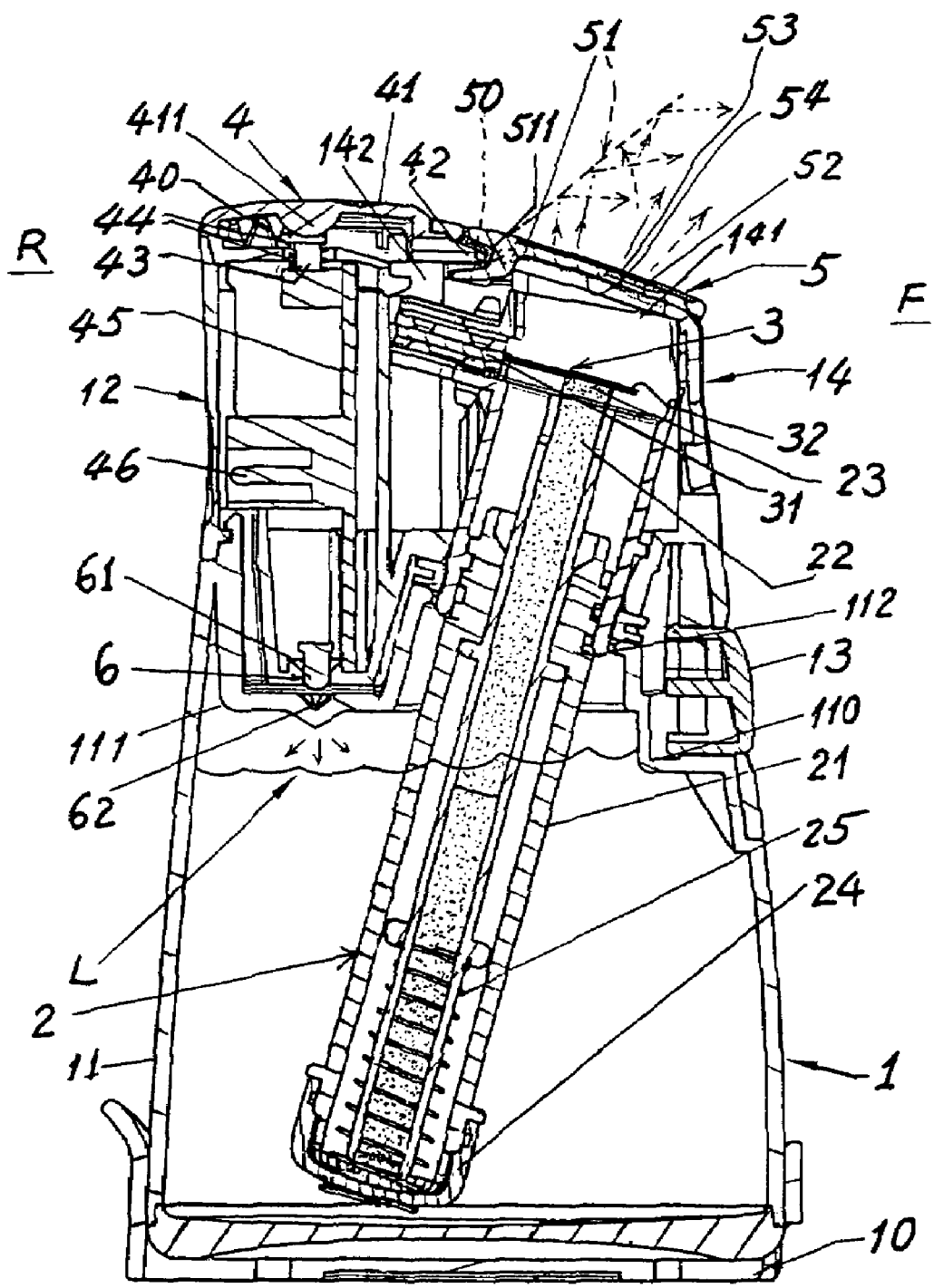
FIG. 2 is a sectional drawing of the present invention.
Figure 3:
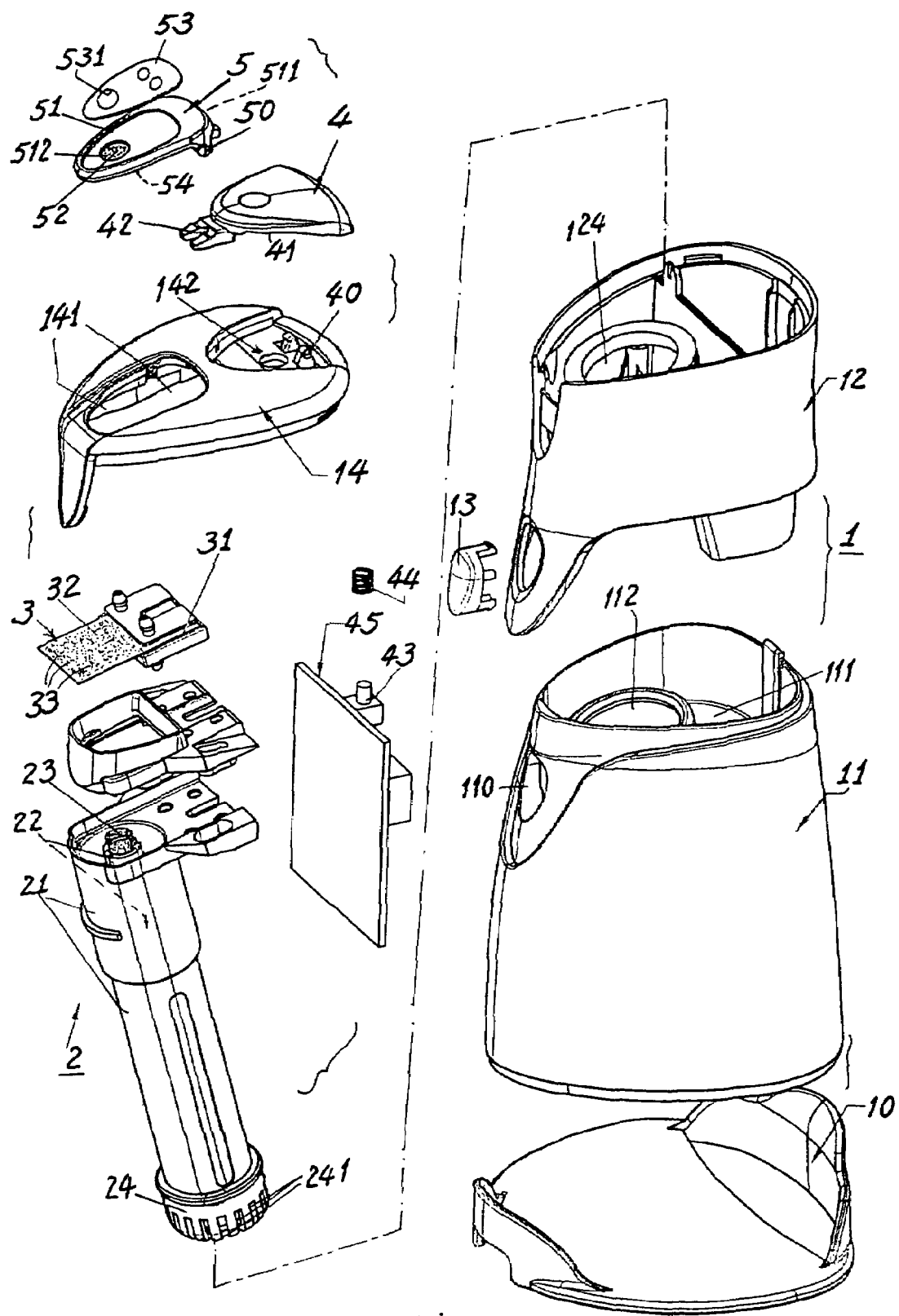
FIG. 3 is an exploded view showing the elements of the present invention.

The capillary means 2 may be inclinedly secured in the housing 1 as shown in FIG. 2 to increase the length of capillary tube for absorbing much water therein. The wick member 22 may be further protected by a sleeve disposed around the wick member 22 which is made of water-absorbable material, such as cotton, foam, etc.

The ultrasonic vibrator 3 includes: a piezoelectric actuator 31 secured in the upper casing 12 and electrically connected to the control means 4; and a perforated vibrating blade 32 having a plurality of perforations 33 formed through the blade 32 and secured to the piezoelectric actuator 31, whereby upon switching-on of the control means 4 to actuate the piezoelectric actuator 31, the vibrating blade 32 will be vibrated to compress the top wick portion 23 having water absorbed therein to eject water mists upwardly outwardly through the perforations 33 in the blade 32 to be spread into the environment through a front opening 141 formed in the top cover 14.

Each perforation 33 formed in the vibrating blade 32 may have a diameter of 6~9 microns, but not limited in the present invention.

The control means 4 includes: a button plate 41 pivotally secured in a rear portion of the top cover 14 by a pivot means 40 for normally shielding a rear opening 142 formed in the top cover 14, a front tooth 42 formed on a front portion of the button plate 41 to be engaged with a pair of bifurcated teeth 511 formed in a rear portion of the sensor means 5 for opening the sensor means 5, a switch button 43 resiliently formed on an electronic module 45 and having a button spring 44 disposed around the switch button 43 to normally urge a central bottom portion of the button plate 41 upwardly to be slightly separated from the switch button 43 (FIGS. 2 and 6) to keep normal-open of the switch button 43, and a power source adapter 46 adapted to be connected with an utility power supply and electrically connected to the electronic module 45, with the electronic module 45 secured in a rear portion of the upper casing 12.

Figure 5:
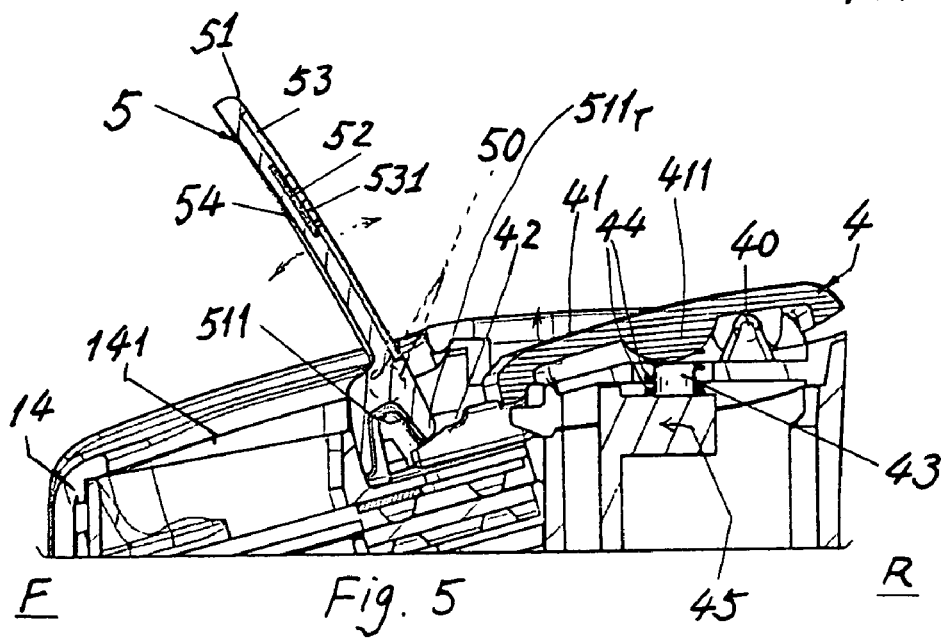
FIG. 5 is a partial sectional drawing of the present invention showing the depression of the control means and opening of the sensor means for spreading water mists outwardly.

The button plate 41 includes a bottom protrusion 411 preferably formed as an arcuate shape as shown in FIG. 5 for smoothly depressing the switch button 43 of the control means 4.

Figure 6:
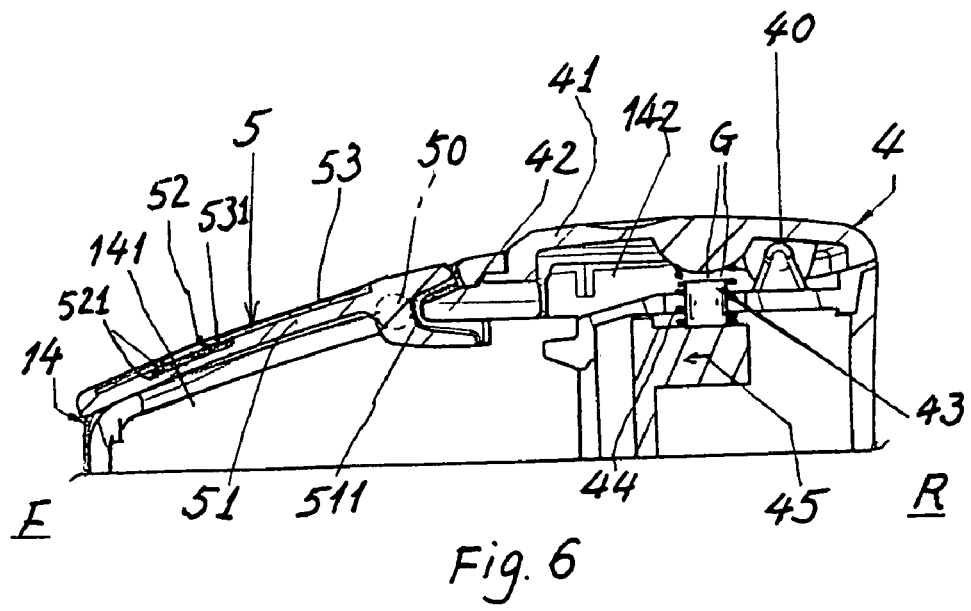
FIG. 6 shows the closing of the sensor means and the restored control means for switching off the vibrator operation of the present invention.

The sensor means 5 includes: a sensor plate 51 pivotally secured in a rear portion of the top cover 14 by a pivot 50 formed on a rear portion of the sensor plate 51 for normally shielding a front opening 141 of the top cover 14, a pair of bifurcated teeth 511 formed on a rearmost end portion of the sensor plate 51 to be engaged with the front tooth 42 of the button plate 41 of the control means 4, a humidity indicator 52 secured in an indicator recess 512 formed in the sensor plate 51 for indicating the humidity as sensed from the surrounding through a vent 531 formed in a cover sheet 53 (with the cover sheet 53 covering the humidity indicator 52 on the sensor plate 51); with the sensor plate 51 corresponding to the vibrating blade 32 of the ultrasonic vibrator 3 adjacent to the front side F of the housing 1; whereby upon depression on the button plate 41 of the control means 4, the front tooth 42 of the button plate 41 will downwardly bias the bifurcated teeth 511 to lift the sensor plate 51 from FIG. 6 to FIG. 5 to open the sensor plate 51 to allow the water mists as ejected by the ultrasonic vibrator 3 to be spread outwardly through the front opening 141 of the top cover 14 for humidifying the surrounding such as in a room or in a car. Simultaneously, the depression of the button plate 41 will downwardly depress the switch button 43 to actuate the ultrasonic vibrator 3 for ejecting the water mists upwardly.

The humidity indicator 52 may be a color-change indicator including cobalt chloride which will be changed from red color to blue color, indicating the change from a wet condition (red) to a dry condition (blue). When it shows a blue color, it indicates the environment is dry and the present invention may be actuated to spread water mists into the air for obtaining a suitable humidity.

Figure 4:
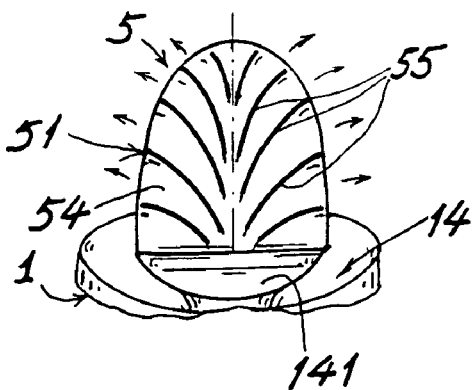
FIG. 4 is a front-view illustration showing an inside wall of the sensor means having guiding ribs flared on the inside wall for homogeneously dispersing the water mists into the surrounding.

The sensor plate 51 has its inside wall 54 formed with a plurality of guiding ribs 55 flared sidewardly from a longitudinal center of the inside wall 54 as shown in FIG. 4 for guiding the water mists as upwardly ejected from the ultrasonic vibrator 3 to be spread outwardly sidewardly for homogeneously dispersing the mists into the surrounding air for rapidly reaching a desired comfortable humidity.

The light indicator 6 includes: at least a lamp 61 such as a light-emitting diode (LED) mounted in a lower portion of the upper casing 12 for projecting light downwardly through a prism lens 62 formed in the covering plate 111 of the bottle 11 for illuminating the water stored in the bottle 11 for checking the water level L whether to refill water into the bottle or not.

The lamp 61 may be modified to be a plurality of LEDs with different colors and may be flashed as driven by a flashing circuit, not limited in the present invention.

Upon decoupling of the upper casing 12 from the bottle 11 by depressing the coupler 13 inwardly, the upper casing 12 and the elements implemented therein will be removed and the water may be re-filled into the bottle through the opening 112.

When depressing the button plate 41 of the control means 4 for starting the ultrasonic vibrator 3, the front tooth 42, as engaged with the bifurcated teeth 511 of the sensor plate 51, will be biased and lifted upwardly as shown in FIG. 5, a rear tooth 511r of the bifurcated teeth 511 will be frictionally engaged with the front tooth 42 to temporarily "lock" the front tooth 42 in position for continuously depressing the switch button 43 for actuating the vibrator 3 during the humidifying operation.

When it is intended to stop the humidification, the sensor plate 51 is lowered to close the opening 141 and the bifurcated teeth 511 will spur the front tooth 42 of the button plate 41 upwardly (from FIG. 5 to FIG. 6) to restore the button plate 41 to allow the button spring 44 to resiliently urge the protrusion 411 of the button plate 41 upwardly to be separated from the switch button 43, remaining a gap G between the button 43 and the button plate 41 and thereby deactivating the vibrator 3 to stop its vibrating operation.

The present invention is superior to the prior art with the following advantages:
1. The humidifier is a compact portable unit, being easily carried and conveniently used in a tiny space.
2. A sensor is provided for checking when to start the ultrasonic vibrator for operating the humidifier in a more scientific way.
3. Light indicator (LED) is provided for always checking the water level (L) in the bottle and also for projecting color light into water for enriching beautiful ornamental effect.
4. Guide means is provided for guiding the water mists from the vibrator to be homogeneously spread outwardly to the air for a more uniform humidity within the room or in a car.

The present invention may be modified without departing from the spirit and scope of the present invention.

The housing may also be further added therein with air-refreshing agent, deodorant or other hygienic agents.

I claim:

1. A portable humidifier comprising:
    a housing for storing water therein;
    a capillary means immersed in said housing for absorbing water into said capillary means;
    an ultrasonic vibrator mounted in said housing and operatively vibrating for compressing a top wick portion of said capillary means for ejecting water mists upwardly outwardly through an upper front opening formed in said housing;
    a control means mounted on said housing and operatively actuating said ultrasonic vibrator for ejecting water mists upwardly outwardly; and
    a sensor means secured on said housing for checking environmental humidity adapted for deciding whether to actuate the control means for ejecting the water mists for humidifying a surrounding.

2. A humidifier according to claim 1, wherein said housing has a light indicator secured therein for illuminating and checking a water level in said housing.

3. A humidifier according to claim 1, wherein said housing includes a transparent bottle, a covering plate formed on an upper portion of the bottle for closing the bottle having an upper opening formed through the covering plate for refilling water into the bottle and for inserting the capillary means into the bottle by passing through the upper opening, a side socket formed in the bottle for resiliently providing a coupler in the socket for coupling an upper casing detachably engaged on an upper portion of the bottle, and a top cover encapping the upper casing; said upper casing having said ultrasonic vibrator formed therein.

4. A humidifier according to claim 3, wherein said capillary means includes: a capillary tube having an upper portion thereof secured in the upper casing of the housing and protruding downwardly through a tube opening formed through the upper casing and through said upper opening in the covering plate to be inserted into the bottle; a wick member longitudinally formed in the capillary tube having a top wick portion protruding upwardly from the capillary tube to be contacted with the ultrasonic vibrator; a bottom plug fixed in a bottom portion of the capillary tube having a plurality of slots formed in the plug to be fluidically communicated with the wick member disposed in the capillary tube; and a tension spring retained in the lower portion of the capillary tube and resiliently urging the wick member upwardly to help a resilient contacting between the top wick portion with the ultrasonic vibrator.

5. A humidifier according to claim 4, wherein said capillary means is inclinedly secured in the housing; and said wick member further including a sleeve disposed around the wick member which is made of water-absorbable material.

6. A humidifier according to claim 1, wherein said ultrasonic vibrator includes: a piezoelectric actuator secured in the upper casing and electrically connected to the control means; and a perforated vibrating blade having a plurality of perforations formed through the blade and secured to the piezoelectric actuator, whereby upon switching-on of the control means to actuate the piezoelectric actuator, the vibrating blade will be vibrated to compress the top wick portion having water absorbed thereon to eject water mists upwardly outwardly through the perforations in the blade to be spread into the environment through a front opening formed in a top cover of the housing.

7. A humidifier according to claim 1, wherein said control means includes: a button plate pivotally secured in a rear portion of a top cover of said housing by a pivot means for normally shielding a rear opening formed in the top cover, a front tooth formed on a front portion of the button plate to be engaged with a pair of bifurcated teeth formed in a rear end portion of the sensor means for opening the sensor means, a switch button resiliently formed on an electronic module and having a button spring disposed around the switch button to normally urge a central bottom portion of the button plate upwardly to be slightly separated from the switch button, and a power source adapter adapted to be connected with an utility power supply and electrically connected to the electronic module, with the electronic module secured in a rear portion of an upper casing of said housing; whereby upon depression on said button plate, said switch button will be actuated to start said ultrasonic vibrator.

8. A humidifier according to claim 7, wherein said button plate includes a bottom protrusion formed as an arcuate shape on a central bottom of said button plate for smoothly depressing the switch button of the control means.

9. A humidifier according to claim 7, wherein said sensor means includes: a sensor plate pivotally secured in a rear portion of the top cover by a pivot formed on a rear portion of the sensor plate for normally shielding a front opening of the top cover, a pair of bifurcated teeth formed on a rearmost end portion of the sensor plate to be engaged with the front tooth of the button plate of the control means, a humidity indicator secured in an indicator recess formed in the sensor plate for indicating the humidity as sensed from the surrounding through a vent formed in a cover sheet, with said cover sheet covering the humidity indicator on the sensor plate; with the sensor plate corresponding to the vibrating blade of the ultrasonic vibrator adjacent to a front side of the housing; whereby upon depression on the button plate of the control means to actuate the ultrasonic vibrator, the front tooth of the button plate will downwardly bias the bifurcated teeth to lift the sensor plate to open the sensor plate to allow the water mists as ejected by the ultrasonic vibrator to be spread outwardly through the front opening of the top cover for humidifying the surrounding.

10. A humidifier according to claim 9, wherein said humidity indicator is a color-change indicator including cobalt chloride which will be changed from a red color to a blue color, indicating the change from a wet condition to a dry condition.

11. A humidifier according to claim 9, wherein said sensor plate has an inside wall formed thereon with including a plurality of guiding ribs, said guiding ribs flared sidewardly outwardly from a longitudinal center of the inside wall for guiding the water mists as upwardly ejected from the ultrasonic vibrator to be spread outwardly sidewardly for homogeneously dispersing the mists into the surrounding for rapidly reaching a desired humidity.

12. A humidifier according to claim 2, wherein said light indicator includes: at least a lamp device mounted in a lower portion of an upper casing of said housing for projecting light downwardly through a prism lens formed in a covering plate of the bottle for illuminating the water stored in the bottle for checking the water level whether to refill water into the bottle or not.

13. A humidifier according to claim 12, wherein said lamp device includes a plurality of light emitting diodes having different colors and operatively flashing as driven by a flashing circuit.

* * * * *